United States Patent
Maruyama et al.

(10) Patent No.: US 9,108,630 B2
(45) Date of Patent: Aug. 18, 2015

(54) DRIVE CONTROL DEVICE FOR HYBRID VEHICLE

(75) Inventors: Tomoyuki Maruyama, Tajimi (JP); Tomohito Ono, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/385,709

(22) PCT Filed: Mar. 21, 2012

(86) PCT No.: PCT/JP2012/057157
§ 371 (c)(1),
(2), (4) Date: Sep. 16, 2014

(87) PCT Pub. No.: WO2013/140544
PCT Pub. Date: Sep. 26, 2013

(65) Prior Publication Data
US 2015/0051769 A1 Feb. 19, 2015

(51) Int. Cl.
*B60L 11/00* (2006.01)
*B60W 10/00* (2006.01)
(Continued)

(52) U.S. Cl.
CPC .................. *B60W 20/00* (2013.01); *B60K 6/26* (2013.01); *B60K 6/365* (2013.01); *B60K 6/387* (2013.01); *B60K 6/445* (2013.01); *B60K 6/48* (2013.01); *B60W 10/02* (2013.01); *B60W 10/08* (2013.01); *B60W 10/12* (2013.01); *B60W 20/50* (2013.01); *B60W 30/18036* (2013.01); *B60K 2006/381* (2013.01); *Y02T 10/6221* (2013.01); *Y02T 10/6239* (2013.01); *Y10S 903/915* (2013.01); *Y10S 903/93* (2013.01)

(58) Field of Classification Search
CPC ............... B60W 2510/1015; B60W 30/18027; B60W 10/16; B60W 20/1084; B60W 2510/081; B60K 6/445; B60K 6/387; B60K 6/365; B60K 6/48; B60K 6/547; B60K 6/383; B60K 6/46; Y02T 10/6239; Y02T 10/6221
USPC ........ 701/22; 180/65.21–65.29; 903/903, 930
See application file for complete search history.

(56) References Cited

U.S. PATENT DOCUMENTS 6,005,297 A 12/1999 Sasaki et al.
2006/0207813 A1* 9/2006 Ishikawa et al. ............. 180/65.4
(Continued)

FOREIGN PATENT DOCUMENTS

JP 3097572 B2 10/2000
JP 2005-138779 A 6/2005
(Continued)

*Primary Examiner* — Muhammad Shafi
(74) *Attorney, Agent, or Firm* — Sughrue Mion, PLLC

(57) ABSTRACT

A drive control device for a hybrid vehicle is provided with a differential device including four rotary elements; and an engine, a first electric motor, a second electric motor and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The drive control device comprises: a reverse drive control portion configured to operate the first electric motor so as to generate a positive torque and operate the second electric motor so as to generate a negative torque, with the clutch being placed in the engaged state, to run the hybrid vehicle in a reverse direction.

6 Claims, 12 Drawing Sheets

(51) Int. Cl.
- *B60W 20/00* (2006.01)
- *B60K 6/445* (2007.10)
- *B60W 10/08* (2006.01)
- *B60K 6/387* (2007.10)
- *B60K 6/48* (2007.10)
- *B60W 10/02* (2006.01)
- *B60W 30/18* (2012.01)
- *B60K 6/26* (2007.10)
- *B60K 6/365* (2007.10)
- *B60W 10/12* (2012.01)
- *B60K 6/38* (2007.10)

(56) References Cited

U.S. PATENT DOCUMENTS

| | | | |
|---|---|---|---|
| 2006/0247086 A1* | 11/2006 | Watanabe et al. | 475/208 |
| 2012/0088621 A1* | 4/2012 | Kasuya et al. | 475/5 |
| 2014/0194238 A1 | 7/2014 | Ono et al. | |

FOREIGN PATENT DOCUMENTS

| | | |
|---|---|---|
| JP | 2008-265600 A | 11/2008 |
| WO | 2013/014777 A1 | 1/2013 |

\* cited by examiner

|   | BK | CL | MODE |
|---|---|---|---|
| EV-1 | ○ |   | 1 |
| EV-2 | ○ | ○ | 2 |
| HV-1 | ○ |   | 3 |
| HV-2 |   | ○ | 4 |
| HV-3 |   |   | 5 |

DRIVE CONTROL DEVICE FOR HYBRID VEHICLE

CROSS REFERENCE TO RELATED APPLICATIONS

This application is a National Stage of International Application No. PCT/JP2012/057157 filed Mar. 21, 2014, the contents of all of which are incorporated herein by reference in their entirety.

TECHNICAL FIELD

The present invention relates to an improvement of a drive control device for a hybrid vehicle.

BACKGROUND ART

There is known a hybrid vehicle which is provided with a differential mechanism having a first rotary element connected to a first electric motor, a second rotary element connected to an engine, and a third rotary element connected to an output rotary member and a second electric motor, and a crankshaft locking device for inhibiting a rotary motion of a crankshaft of the engine, and which can run in a second motor drive mode in which the first and second electric motors are both operated as a vehicle drive power source, as well as in an ordinary first motor drive mode in which the second electric motor is operated as the vehicle drive power source.

PRIOR ART DOCUMENT

Patent Document

Patent Document 1: JP-2008-265600 A1

SUMMARY OF THE INVENTION

Object Achieved by the Invention

It is considered to configure a hybrid vehicle such that the hybrid vehicle is provided with: a first differential mechanism having a first rotary element connected to a first electric motor, a second rotary element connected to an engine, and a third rotary element connected to an output rotary member; a second differential mechanism which has a first rotary element connected to a second electric motor, a second rotary element and a third rotary element, and in which one of the second and third rotary elements is connected to the third rotary element of the first differential mechanism; a clutch for selectively connecting the second rotary element of the first differential mechanism, and one of the other of the second and third rotary elements of the second differential mechanism not connected to the third rotary element of the first differential mechanism, to each other; and a brake for selectively fixing the above-indicated other of the second and third rotary elements of the second differential mechanism not connected to the third rotary element of the first differential mechanism, to a stationary member. This hybrid vehicle can be run in a second motor drive mode in which the first and second electric motors are operated to drive the hybrid vehicle while the brake and the clutch are placed in an engaged state, as well as in a first motor drive mode in which the second electric motor is primarily operated to drive the hybrid vehicle while the brake is placed in the engaged state.

The hybrid vehicle configured as described above can also be run in hybrid drive modes in which the engine and the first or second electric motor are operated as a vehicle drive power source. The hybrid drive modes include a first hybrid drive mode in which the brake is placed in the engaged state while the clutch is placed in a released state, and a second hybrid drive mode in which the engine is used as a vehicle drive power source and the brake is placed in a released state while the clutch is placed in the engaged state. These first and second hybrid drive modes are selectively established depending upon a speed ratio, making it possible to further improve transmission efficiency of the hybrid vehicle.

By the way, the above-described hybrid vehicle can be run in a reverse direction by the second electric motor while the brake is placed in the engaged state. The hybrid vehicle cannot be run in an adequate manner, when the hybrid vehicle is in a mode in which the brake cannot be brought into the engaged state, or if the brake fails to normally function. If the hybrid vehicle is run in the reverse direction by the second electric motor while the brake is not placed in the engaged state, the hybrid vehicle can be run in the reverse direction if an output torque of the second electric motor is balanced with respect to or less than a friction torque of the engine held at rest. In this case, the output torque of the second electric motor is limited, so that a reverse drive force of the hybrid vehicle is accordingly limited, giving rise to a problem that the hybrid vehicle cannot be run in the reverse direction on a convex surface of a roadway, or on an uphill roadway.

The present invention was made in view of the background art described above. It is therefore an object of the present invention to provide a drive control device for a hybrid vehicle, which permits the hybrid vehicle to be run in a reverse drive mode with a sufficient drive force.

Means for Achieving the Object

The object indicated above is achieved according to the principle of the present invention, which provides a drive control device for a hybrid vehicle provided with: (a) a first differential mechanism and a second differential mechanism which have four rotary elements as a whole; and an engine, a first electric motor, a second electric motor and an output rotary member which are respectively connected to the above-described four rotary elements, and wherein (b) one of the above-described four rotary elements is constituted by the rotary element of the above-described first differential mechanism and the rotary element of the above-described second differential mechanism which are selectively connected to each other through a clutch, and (c) one of the rotary elements of the above-described first and second differential mechanisms which are selectively connected to each other through the above-described clutch is selectively fixed to a stationary member through a brake, (d) the drive control device being characterized by operating the above-described first electric motor so as to generate a positive torque and operating the above-described second electric motor so as to generate a negative torque, with the above-described clutch being placed in an engaged state, to run the hybrid vehicle in a reverse direction.

Advantages of the Invention

The hybrid vehicle controlled by the drive control device according to the present invention is configured to operate the above-described first electric motor so as to generate a positive torque and operate the above-described second electric motor so as to generate a negative torque, with the above-described clutch being placed in the engaged state, to run the hybrid vehicle in the reverse direction. Accordingly, a sufficient vehicle drive force can be obtained without having to operate the engine or to change an operating speed of the engine.

According to one preferred form of the invention, (e) the positive torque and the negative torque generated by the above-described first electric motor and the above-described second electric motor in a non-operated state of the above-described engine are controlled so as to prevent a rotary motion of the above-described engine. According to this form of the invention, the engine is held in the non-operated state without a rotary motion while the hybrid vehicle is run in the reverse direction, so that it is possible to prevent deterioration of fuel economy due to a friction loss of the engine operated in the positive direction, and reduction of durability of the engine due to its rotary motion in the negative direction.

According to another preferred form of the invention, (f) the positive torque generated by the above-described first electric motor is controlled so as to generate a reverse vehicle drive force corresponding to a required vehicle drive force, and (g) the negative torque generated by the above-described second electric motor is controlled so as to prevent a rotary motion of the above-described engine in a positive or negative direction. According to this form of the invention, the positive torque generated by the first electric motor is controlled so as to generate the reverse vehicle drive force corresponding to the required vehicle drive force, so that the reverse vehicle drive force is generated according to an intention of an operator of the hybrid vehicle. Further, the negative torque generated by the second electric motor is controlled so as to prevent the rotary motion of the engine in the positive or negative direction, so that it is possible to prevent deterioration of the fuel economy due to a friction loss of the engine rotated in the positive direction and reduction of the durability of the engine due to its rotary motion in the negative direction.

According to a further preferred form of the invention, (h) the positive torque and the negative torque generated by the above-described first electric motor and the above-described second electric motor in an operated state of the above-described engine are controlled so as to prevent a change of an operating speed of said engine. According to this form of the invention, the operating speed of the engine is held constant while the hybrid vehicle is run in the reverse direction, so that it is possible to prevent deterioration of fuel economy due to a friction loss of the engine caused by a rise of the operating speed of the engine, and deterioration of the fuel economy due to a warm-up operation of the engine at a predetermined speed which would be performed as a result of a drop of the engine speed, for instance.

According to a still further preferred form of the invention, (i) the positive torque generated by the above-described first electric motor is controlled so as to generate a reverse vehicle drive force corresponding to a required vehicle drive force, and (j) the negative torque generated by the above-described second electric motor is controlled so as to prevent the change of the operating speed of the above-described engine. According to this preferred form of the invention, the positive torque generated by the first electric motor is controlled so as to generate the reverse vehicle drive force corresponding to the required vehicle drive force, so that the reverse vehicle drive force is generated according to an intention of the operator of the hybrid vehicle. Further, the negative torque generated by the second electric motor is controlled so as to prevent the change of the operating speed of the engine, so that it is possible to prevent deterioration of the fuel economy due to the friction loss of the engine caused by the rise of the engine speed, and deterioration of the fuel economy due to an idling operation of the engine at a predetermined speed which would be performed as a result of a drop of the engine speed, for instance.

According to a yet further preferred form of the invention, (k) the above-described first electric motor is operated in a positive direction so as to generate the positive torque, while the above-described second electric motor is operated in a positive direction so as to generate the negative torque. According to this preferred form of the invention, the second electric motor performs a regenerative operation to generate the negative torque, so that an electric energy generated by the regenerative operation can be consumed by the first electric motor to generate the positive torque.

In the hybrid vehicle according to still another preferred form of the invention, the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to a stationary member.

MODE FOR CARRYING OUT THE INVENTION

Figure 1:
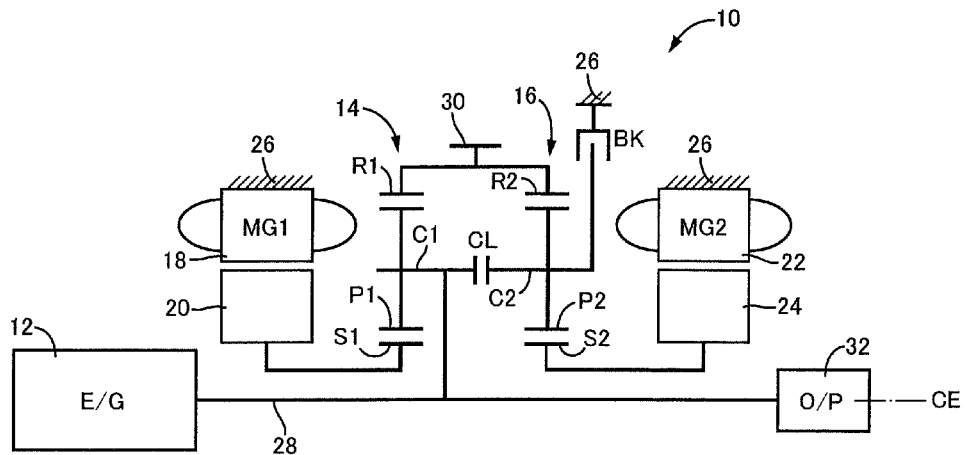
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, the engine, the first electric motor, the second electric motor and the output rotary member coupled to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source with the engine stopped include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy as needed, include a mode 3 to be established in the engaged state of the brake and in the released state of the clutch, a mode 4 to be established in the released state of the brake and the engaged state of the clutch, and a mode 5 to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which is provided with rotary elements (elements) consisting of a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio ρ2 and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
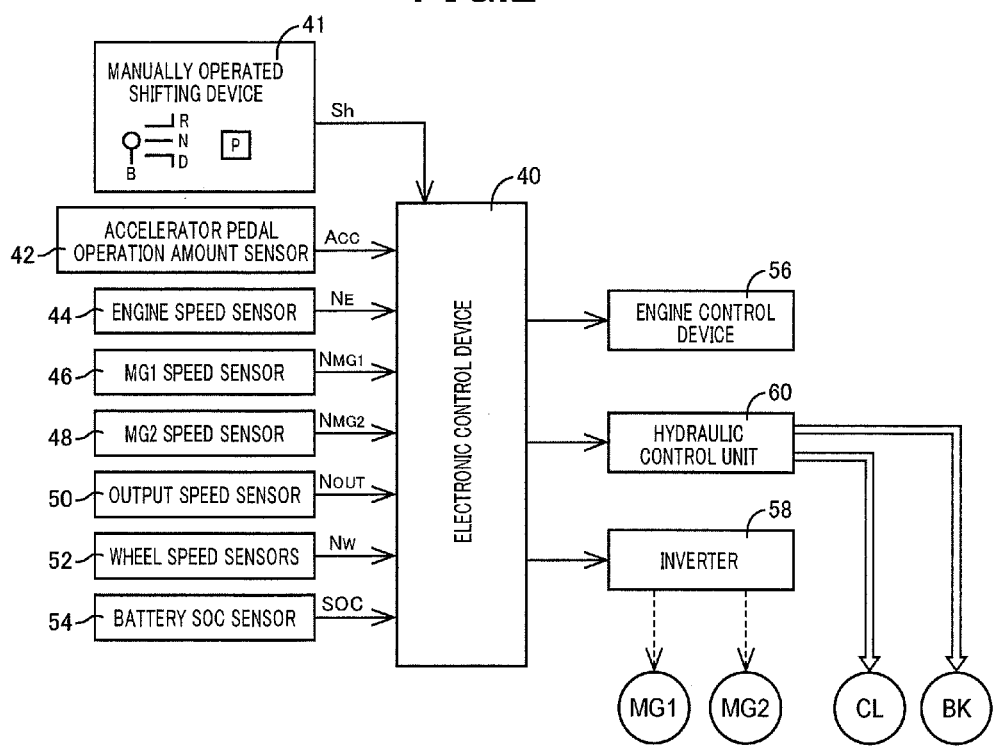
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: a shift position signal Sh generated by a manually operated shifting device 41, which is indicative of a presently selected one of a parking position, a neutral position, a forward drive position, a reverse drive position, etc.; an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of wheel speed sensors 52 indicative of rotating speeds $N_W$ of wheels in the drive system 10; and an output signal of a battery SOC sensor 54 indicative of a stored electric energy amount (state of charge) SOC of a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and MG2 are supplied to and stored in the battery through the inverter 58. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
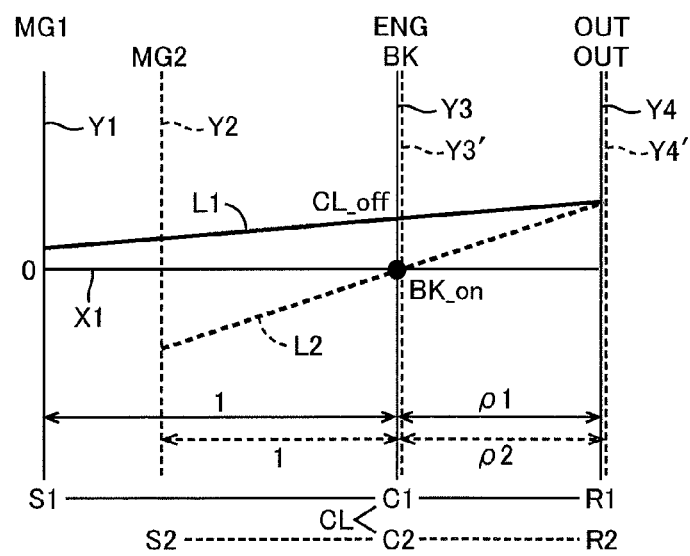
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the mode 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV drive modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (first drive mode) in the form of the drive mode EV-1 which is established in the engaged state of the brake BK and in the released state of the clutch CL; and a mode 2 (second drive mode) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of a mode 3 (third drive mode) in the form of the drive mode HV-1 which is established in the engaged state of the brake BK and in the released state of the clutch CL; a mode 4 (fourth drive mode) in the form of the drive mode HV-2 which is established in the released state of the brake BK and in the engaged state of the clutch CL; and a mode 5 (fifth drive mode) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios $\rho$ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios $\rho1$ and $\rho2$ of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "$\rho1$". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "$\rho2$". In the drive system 10, the gear ratio $\rho2$ of the second planetary gear set 16 is higher than the gear ratio $\rho1$ of the first planetary gear set 14 ($\rho2>\rho1$). The drive modes of the drive system 10 will be described by reference to FIGS. 4-7.

The drive mode EV-1 indicated in FIG. 3 corresponds to the mode 1 (first motor drive mode) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier Cl of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode in which running using the second electric motor MG2 in forward and backward direction can be performed, similar to an EV (electric) drive mode which is established in a vehicle provided with a so-called "THS" (Toyota Hybrid System) and in which the carrier C2 is fixed to the stationary member.

Figure 5:
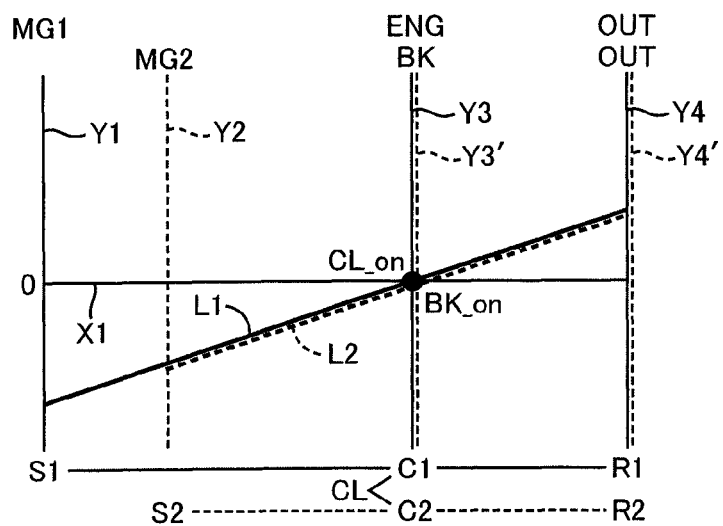
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (second drive mode) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear 51 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 can be driven in the forward or reverse direction by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the mode 2 is an EV drive mode which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (third drive mode) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
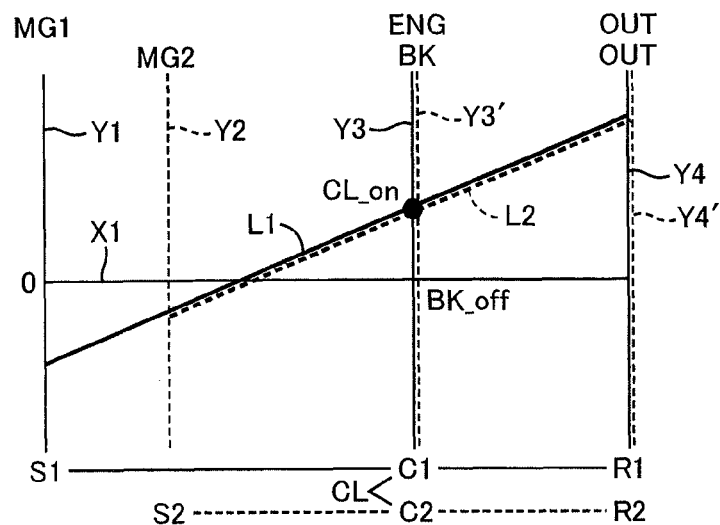
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (fourth drive mode) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho 1$ and $\rho 2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho 1$ and $\rho 2$. Accordingly, the drive system 10 is configured such that the gear ratio $\rho 2$ of the second planetary gear set 16 is higher than the gear ratio $\rho 1$ of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, so that each of the first and second electric motors MG1 and MG2 can be operated at an operating point assuring a relatively high degree of operating efficiency, and/or with a reduced degree of torque limitation due to heat generation.

Figure 7:
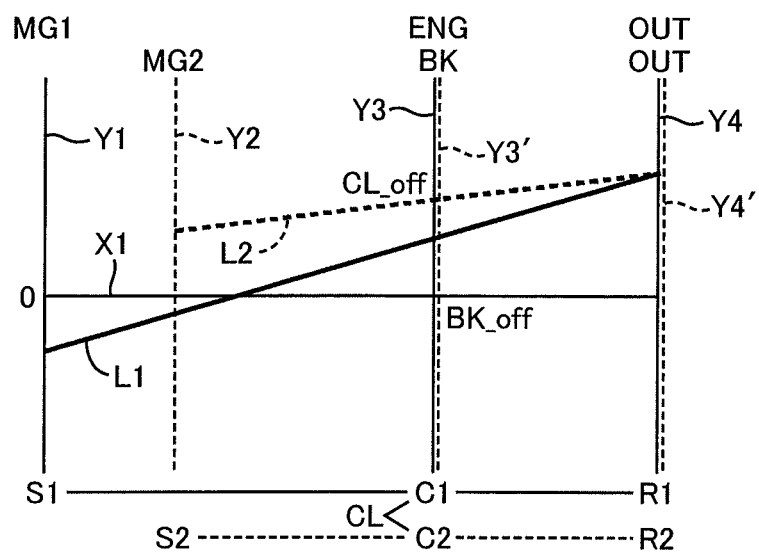
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (fifth drive mode) of the drive system 10, which is preferably the hybrid drive mode in which the engine 12 is operated as the vehicle drive power source while the first electric motor MG1 is operated to generate an electric energy, with a continuous change of the speed ratio, and with an operating point of the engine 12 being moved along a predetermined optimum operating curve. In this mode 5, the engine 12 and first electric motor MG1 may be operated to generate a vehicle drive force, with the second electric motor MG2 being disconnected from a drive system. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source while the first and second electric motors MG1 and MG2 are operated as needed to generate a vehicle drive force and/or an electric energy, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 8:
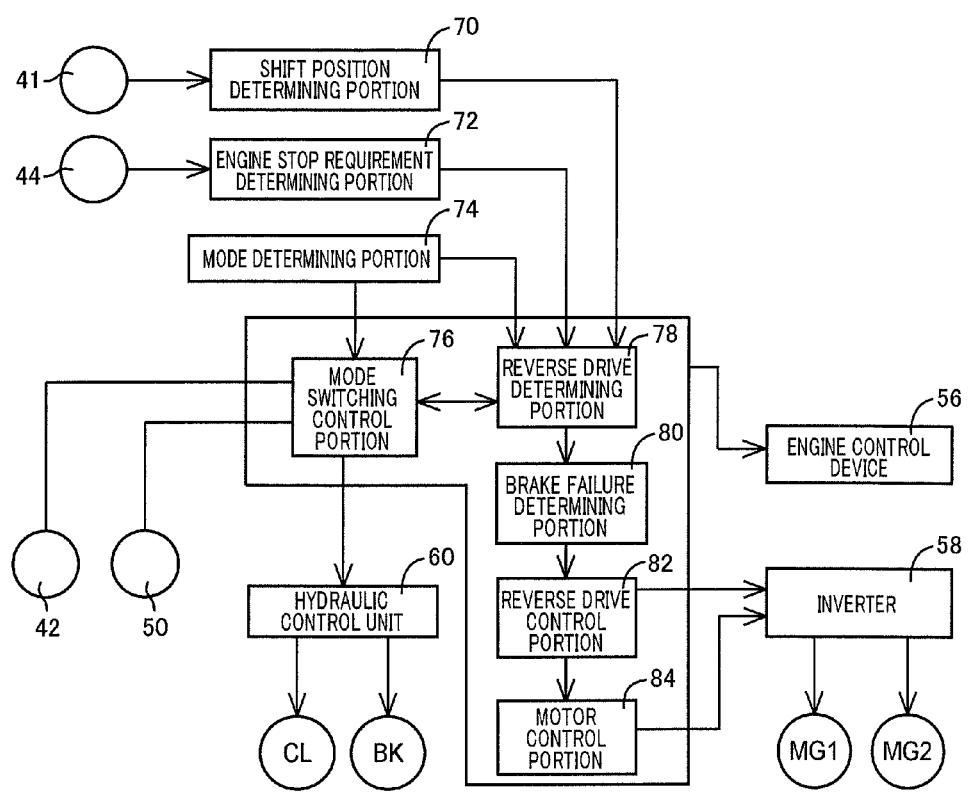
FIG. 8 is a functional block diagram for explaining major control functions of an electronic control device shown in FIG. 2.

FIG. 8 is the functional block diagram for explaining major control functions of the electronic control device 40 as shown in FIG. 2. A shift position determining portion 70 shown in FIG. 8 is configured to determine the presently selected shift position of the manually operated shifting device 41. For instance, the shift position determining portion 70 determines whether the presently selected shift position is the parking position or not, on the basis of the shift position signal Sh received from the manually operated shifting device 41. An engine stop requirement determining portion 72 is configured to determine whether the engine 1 which has been kept in an operated state (under the control of the engine control device 56) is required to be stopped. For instance, the engine stop requirement determining portion 72 determines that the engine 12 is required to be stopped, if a required vehicle drive force represented by the accelerator pedal operation amount and the vehicle running speed has become smaller than a predetermined lower limit, if the stored electric energy amount SOC of an electric energy storage device not shown has exceeded a charging upper limit and charging is restricted, or if an output signal of an ignition switch not shown has changed from an ON state (operating state) to operate the engine 12 to an OFF state (non-operating state) to stop the engine 12. A mode determining portion 74 is configured to determine a presently established one of the five modes consisting of the drive modes EV-1 (mode 1), EV-2 (mode 2), HV-1 (mode 3), HV-2 (mode 4) and HV-3 (mode 5), on the basis of vehicle parameters such as the required vehicle drive force, the vehicle running speed V, the accelerator pedal operation amount $A_{CC}$, the stored electric energy amount SOC and operating temperatures, or on the basis of output states of the engine control device 56 and the inverter 58, an output state of a mode switching control portion 76, or an already set state of an appropriate memory flag.

The mode switching control portion 76 is configured to implement a mode switching control for placing the drive system 10 in one of the drive modes selected by the mode determining portion 74. For instance, the mode switching control portion 76 determines whether the drive system 10 should be placed in an electric drive mode or a hybrid drive mode, depending upon whether the operator's required vehicle drive force represented by the vehicle running speed V and the accelerator pedal operation amount $A_{CC}$ lies in a predetermined electric drive region or an engine drive region, or on the basis of a requirement based on the stored electric energy amount SOC. If the electric drive mode is selected, the mode switching control portion 76 establishes one of the drive modes EV-1 (mode 1) and EV-2 (mode 2), on the basis of the requirement based on the stored electric energy amount SOC and the operator's selection. If the hybrid drive mode is selected, the mode switching control portion 76 establishes one of the drive modes HV-1 (mode 3), HV-2 (mode 4) and HV-3 (mode 5), on the basis of the operating efficiency of the engine 12, the transmission efficiency, the required vehicle drive force, etc., so as to provide a good compromise between the vehicle drivability and the fuel economy. For example, the mode switching control portion 76 establishes the drive mode HV-1 (mode 3) at a relatively low running speed in a relatively low-gear (high speed-reduction ratio) range, the drive mode HV-2 (mode 4) at a relatively intermediate running speed in a relatively intermediate-gear (intermediate speed-reduction ratio) range, the drive mode HV-3 (mode 5) at a relatively high running speed in a relatively high-gear (low speed-reduction ratio) range. This mode switching control portion 76 releases the clutch CL and engages the brake BK through the hydraulic control unit 60, for switching the drive mode from the drive mode HV-2 (mode 4) to the drive mode HV-1 (mode 3). Namely, the mode switching control portion 76 switches the operating state from the state shown in the collinear chart of FIG. 6 to the state shown in the collinear chart of FIG. 4.

A reverse drive determining portion 78 is configured to determine that a reverse drive mode of the hybrid vehicle has been established, if the shift position determining portion 70 determines that an "R" position is selected while the hybrid vehicle is held stationary with wheel brakes being operated, for example. A brake failure determining portion 80 is configured to determine whether the brake BK fails to normally function. For example, this determination is made depending upon whether a sufficient engaging hydraulic pressure of the brake BK is detected by a hydraulic pressure sensor provided in the hydraulic control unit 60, in the presence of a command to engage the brake BK. Alternatively, the determination is made depending upon whether the rotating speed of the carrier C2 calculated from the operating speed $N_{MG2}$ of the second electric motor MG2 (rotating speed of the sun gear S2) and the rotating speed $N_{OUT}$ of the output gear 30 (rotating speed of the ring gear R2) corresponding to the vehicle running speed V, is zero or not during presence of a command to engage the brake BK.

A reverse drive control portion 82 is configured to establish the EV-1 mode or EV-2 mode and to initially operate the second electric motor MG2 or the first and second electric motors MG1 and MG2 to generate a reverse drive creep torque, and then operate the second electric motor MG2 to generate a reverse drive force according to the accelerator pedal operation amount when the manually operated shifting device 41 is operated to "R" position, when the brake failure determining portion 80 determines that the brake BK does not fail to normally function. When the brake failure determining portion 80 determines that the brake BK fails to normally function, however, the EV-1 mode or EV-2 mode cannot be established due to a failure of the brake BK. In this event, the reverse drive control portion 82 operates the first electric motor MG1 so as to generate a positive torque and operates the second electric motor MG2 so as to generate a negative torque, with the clutch CL being placed in the engaged state, for generating a reverse vehicle drive force, such that the engine 12 is held at rest or such that the operating speed of the engine 12 is maintained (engine speed $N_E$ is held constant), as indicated in FIG. 9.

Figure 9:
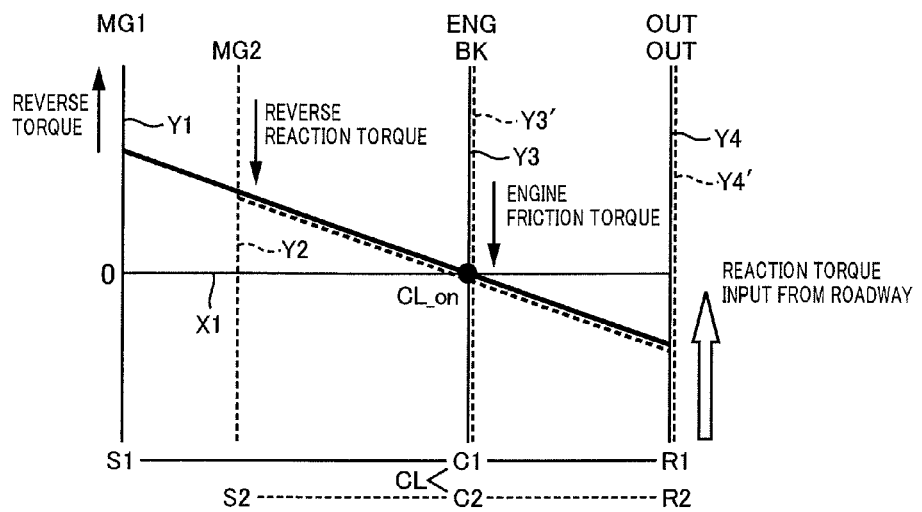
FIG. 9 is a collinear chart for explaining a control operation performed by a reverse drive control portion shown in FIG. 8, while an engine is placed in a non-operated state.

FIG. 9 is the collinear chart for explaining the reverse drive control operation in the event of a failure of the brake BK while the engine 12 is placed in a non-operated state. In this state, the clutch CL is brought into the engaged state, and the first electric motor MG1 is operated so as to generate a reverse vehicle drive force corresponding to a predetermined creep torque, where a required vehicle drive force is zero, or so as to generate a reverse vehicle drive force or torque corresponding to the required vehicle drive force, namely, operated in the positive direction so as to generate a positive torque, where the required vehicle drive force is not zero, as indicated in FIG. 9. On the other hand, the second electric motor MG2 is operated in the positive direction so as to generate a reverse reaction force, that is, a negative torque, such that the engine 12 is held at rest, namely, so as to prevent a rotary motion of the engine 12 in a positive or negative direction, as also indicated in FIG. 9, while the first electric motor MG1 is operated in the positive direction so as to generate the positive torque. The second electric motor MG2 is operated in the positive direction so as to generate the negative torque, and so as to prevent the engine 12 from receiving a torque larger than a friction torque due to its rotary motion.

Figure 10:
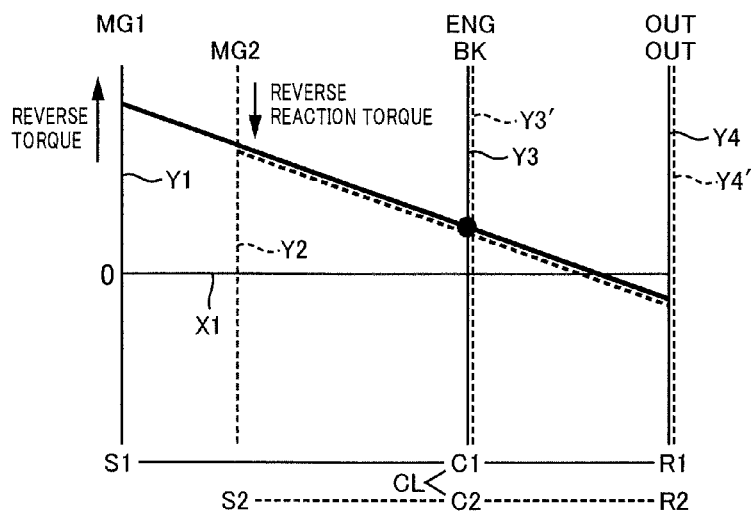
FIG. 10 is a collinear chart for explaining a control operation performed by the reverse drive control portion shown in FIG. 8, while the engine is placed in an operated state.

FIG. 10 is the collinear chart for explaining the reverse drive control operation in the event of a failure of the brake BK while the engine 12 is operated at a predetermined speed to perform a warm-up operation or to charge the electric-energy storage device. In this state, the clutch CL is brought into the engaged state, and the first electric motor MG1 is operated so as to generate a reverse vehicle drive force corresponding to a predetermined creep torque, where the required vehicle drive force is zero, or so as to generate a reverse vehicle drive force or torque corresponding to the required vehicle drive force, namely, operated in the positive direction so as to generate a positive torque, where the required vehicle drive force is not zero, as indicated in FIG. 10. On the other hand, the second electric motor MG2 is operated in the positive direction so as to generate a reverse reaction force torque, that is, a negative torque, such that the engine 12 is held operated at the same speed to perform the warm-up operation or charge the electric-energy storage device, namely, so as to prevent a rise or drop of the operating speed of the engine 12, as also indicated in FIG. 10, while the first electric motor MG1 is operated in the positive direction so as to generate the positive torque.

A motor control portion 84 is configured to apply electric energies to the first and second electric motors MG1 and MG2 through the inverter 58 according to control commands received from the reverse drive control portion 82, for operating the first and second electric motors MG1 and MG2 to generate the required torques.

Figure 11:
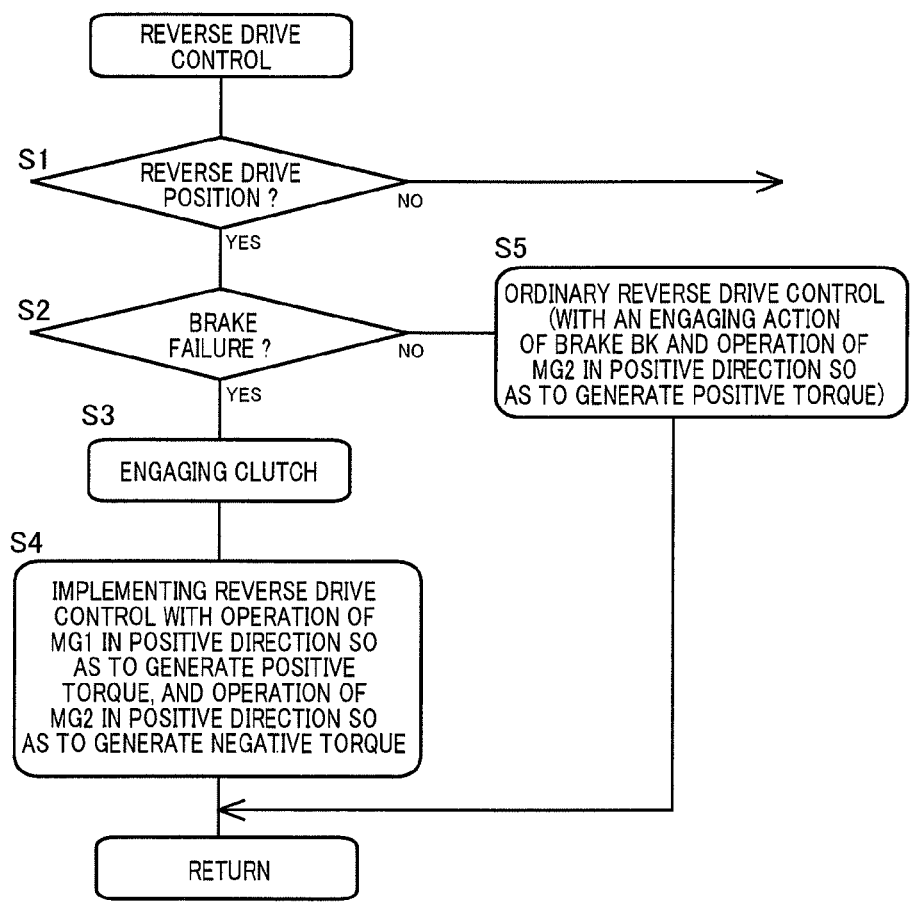
FIG. 11 is a flow chart for explaining a major portion of a reverse drive control of the hybrid vehicle implemented by the electronic control device shown in FIG. 2, in the event of a failure of the brake of the drive system.
Figure 12:
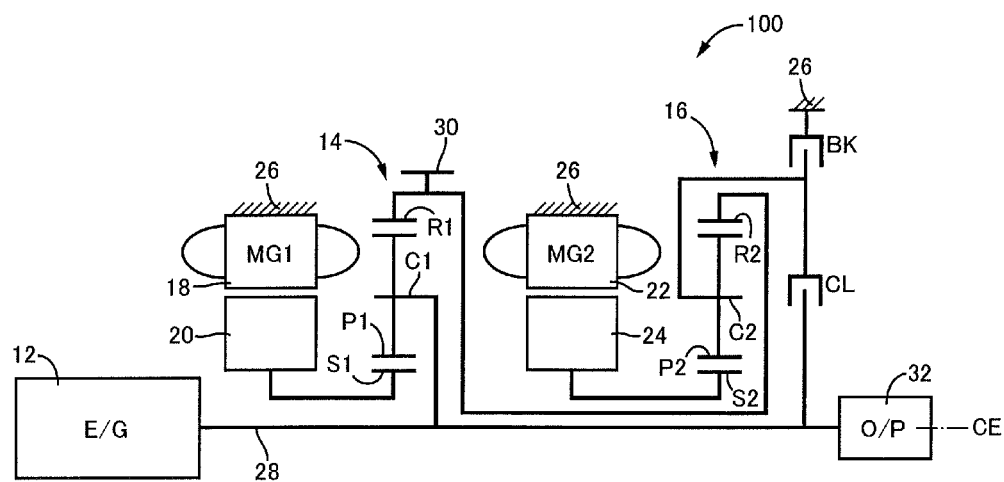
FIG. 12 is a schematic view for explaining an arrangement of a hybrid vehicle drive system according to another preferred embodiment of this invention.
Figure 13:
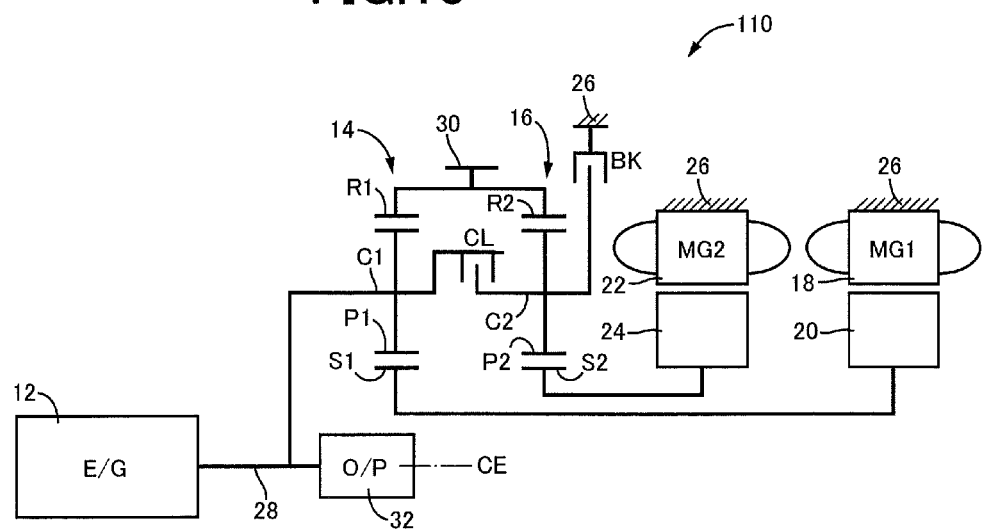
FIG. 13 is a schematic view for explaining an arrangement of a hybrid vehicle drive system according to a further preferred embodiment of this invention.
Figure 14:
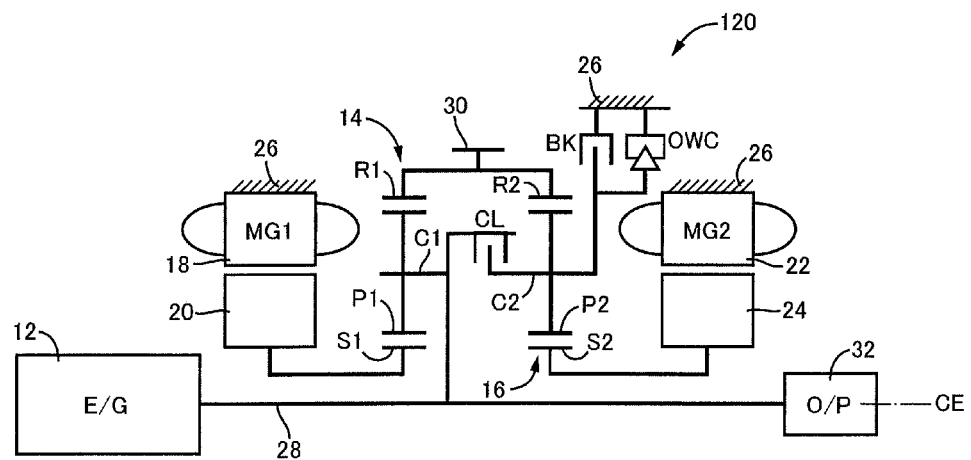
FIG. 14 is a schematic view for explaining an arrangement of a hybrid vehicle drive system according to a still further preferred embodiment of this invention.
Figure 15:
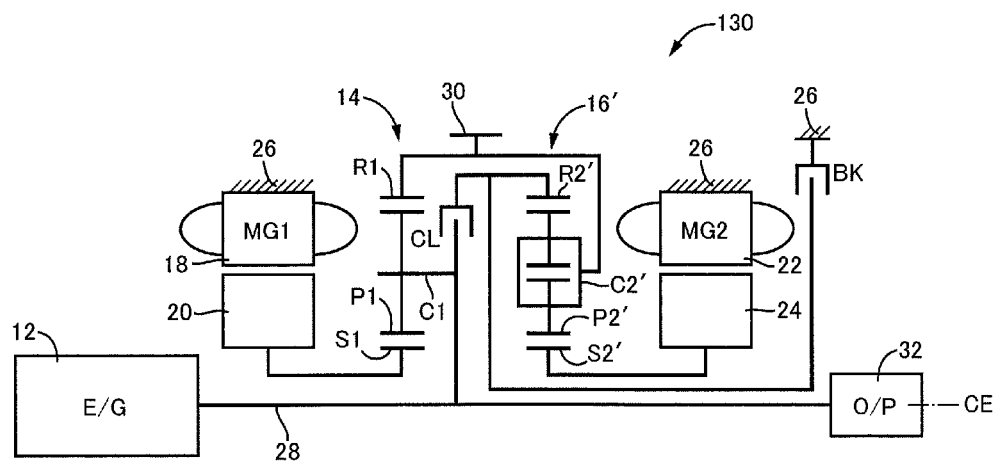
FIG. 15 is a schematic view for explaining an arrangement of a hybrid vehicle drive system according to a yet further preferred embodiment of this invention.
Figure 16:
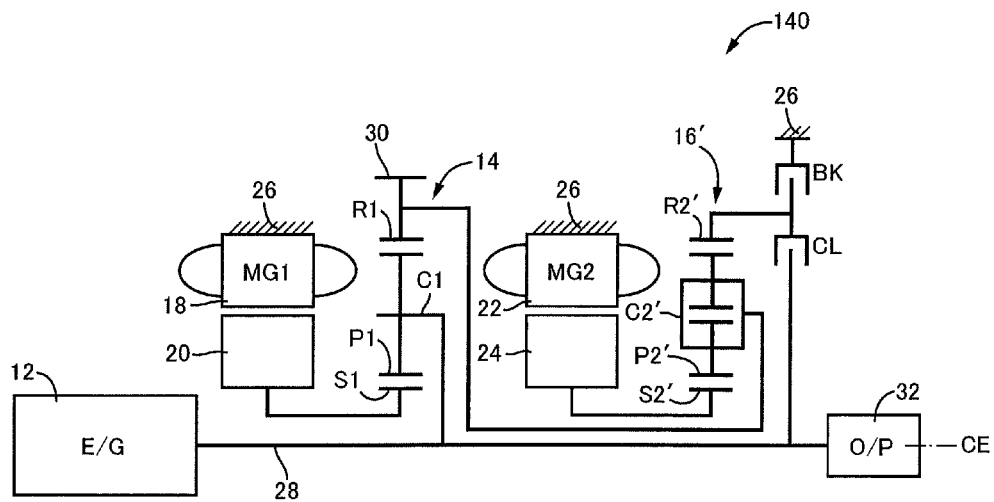
FIG. 16 is a schematic view for explaining an arrangement of a hybrid vehicle drive system according to still another preferred embodiment of this invention.
Figure 17:
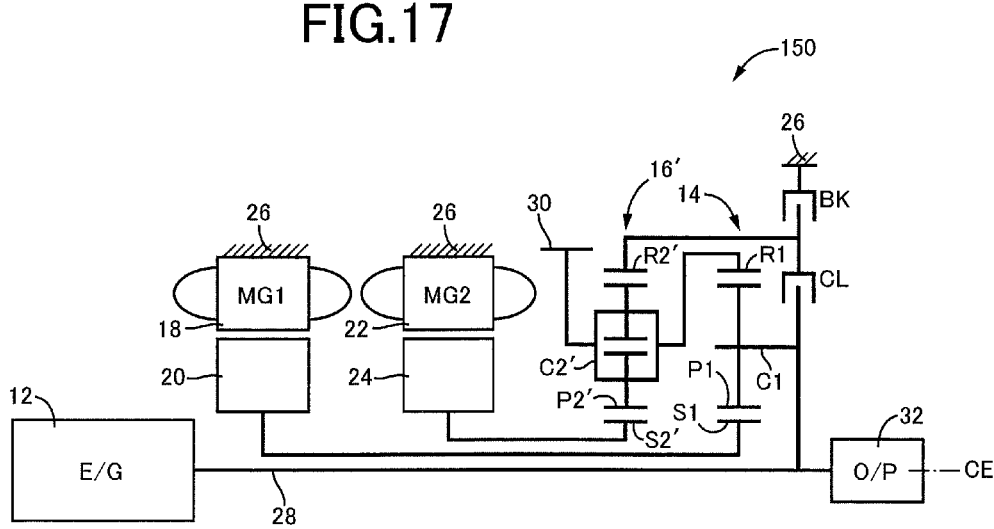
FIG. 17 is a schematic view for explaining an arrangement of a hybrid vehicle drive system according to yet another preferred embodiment of this invention.

FIG. 11 is the flow chart for explaining a major portion of a reverse drive control operation of the electronic control device 40 of FIG. 2. The reverse drive control operation is repeatedly performed with a predetermined cycle time.

The reverse drive control operation is initiated with step S1 ("step" being hereinafter omitted) corresponding to the reverse drive determining portion 78, to determine whether the vehicle operator has required to establish the reverse drive mode, depending upon whether the shift position determining portion 70 has determined that the "R" position is selected. If a negative determination is obtained in S1, the control flow goes to other control steps. If an affirmative determination is obtained in S1, the control flow goes to S2 corresponding to the brake failure determining portion 80, to determine whether the brake BK fails to normally function, depending upon whether the sufficient engaging hydraulic pressure of the brake BK is detected by the hydraulic pressure sensor provided in the hydraulic control unit 60, in the presence of the command to engage the brake BK. If a negative determination is obtained in S2, the control flow goes to S5 corresponding to the reverse drive control portion 82, to implement an ordinary reverse drive control, that is, to operate the second electric motor in the positive direction so as to generate the positive torque, with the brake BK being placed in the engaged state, for running the hybrid vehicle in the reverse direction with a creep torque, or with a reverse vehicle drive force corresponding to the required vehicle drive force.

If an affirmative determination is obtained in S2, the control flow goes to S3 corresponding to the reverse drive control portion 82, to bring the clutch CL into the engaged state, and then goes to S4 corresponding to the reverse drive control portion 82, to operate the first electric motor MG1 so as to generate the positive torque, and operate the second electric motor MG2 so as to generate the negative torque, for generating the reverse vehicle drive force, such that the engine 12 is held at rest or such that the operating speed of the engine 12 is maintained (engine speed NE is held constant).

The drive control device for the hybrid vehicle according to the present embodiment described above is provided with: the first planetary gear set 14 (first differential mechanism) having the sun gear S1 (first rotary element) connected to the first electric motor MG1, the carrier C1 (second rotary element) connected to the engine 12, and the ring gear R1 (third rotary element) connected to the output gear 30 (output rotary member); the second planetary gear set 16 (second differential mechanism) having the sun gear S2 (first rotary element) connected to the second electric motor MG2, the carrier C2 (second rotary element) and the ring gear R2 (third rotary element), one of these second and third rotary elements being connected to the third rotary element of the first planetary gear set 14 (first differential mechanism); the clutch CL for selectively connecting the carrier C1 (second rotary element) of the first planetary gear set 14, and the other of the carrier C2 (second rotary element) and the ring gear R2 (third rotary element) of the second planetary gear set 16 which is not connected to the ring gear R2 R1 (third rotary element) of the first planetary gear set 14, to each other; and the brake BK for selectively fixing the above-indicated other of the carrier C2 (second rotary element) and the ring gear R2 (third rotary element) of the second planetary gear set 16 which is not connected to the ring gear R1 (third rotary element) of the first planetary gear set 14, to the housing 26 (stationary member). The drive control device is configured to operate the first electric motor MG1 in the positive direction so as to generate a positive torque and operate the second electric motor MG2 in the positive direction so as to generate a negative torque, with the clutch CL being placed in the engaged state, in place of the brake BK failing to normally function, to run the hybrid vehicle in the reverse direction. Accordingly, a sufficient reverse vehicle drive force can be obtained without having to operate the engine 12 or to change the operating speed of the engine 12.

The drive control device for the hybrid vehicle according to the present embodiment is further configured such that the positive torque and the negative torque which are generated by the first electric motor MG1 and the second electric motor MG2 in the non-operated state of the engine 12 are controlled so as to prevent a rotary motion of the engine 12. Accordingly, the engine 12 is held in the non-operated state without a rotary motion while the hybrid vehicle is run in the reverse direction, so that it is possible to prevent deterioration of the fuel economy due to a friction loss of the engine 12 operated in the positive direction, and reduction of durability of the engine 12 due to its rotary motion in the negative direction.

The drive control device for the hybrid vehicle according to the present embodiment is also configured such that the positive torque generated by the first electric motor MG1 is controlled so as to generate a reverse vehicle drive force corresponding to a required vehicle drive force, and the negative torque generated by the second electric motor MG2 is controlled so as to prevent a rotary motion of the engine 12 in a positive or negative direction. Accordingly, the positive torque generated by the first electric motor MG1 is controlled so as to generate the reverse vehicle drive force corresponding to the required vehicle drive force, so that the reverse vehicle drive force is generated according to an intention of the operator of the hybrid vehicle. Further, the negative torque generated by the second electric motor MG2 is controlled so as to prevent the rotary motion of the engine 12 in the positive or negative direction, so that it is possible to prevent deterioration of the fuel economy due to a friction loss of the engine 12 rotated in the positive direction and reduction of the durability of the engine 12 due to its rotary motion in the negative direction.

The drive control device for the hybrid vehicle according to the present embodiment is further configured such that the positive torque and the negative torque generated by the first electric motor MG1 and the second electric motor MG2 in an operated state of the engine 12 are controlled so as to prevent a change of the operating speed of the engine 12. Accordingly, the operating speed of the engine 12 is held constant while the hybrid vehicle is run in the reverse direction, so that it is possible to prevent deterioration of the fuel economy due to a friction loss of the engine 12 caused by a rise of the operating speed of the engine 12, and deterioration of the fuel economy due to a warm-up operation of the engine 12 at a predetermined speed which would be performed as a result of a drop of the engine speed, for instance.

The drive control device for the hybrid vehicle according to the present embodiment is also configured such that the positive torque generated by the first electric motor MG1 is controlled so as to generate a reverse vehicle drive force corresponding to a required vehicle drive force, and such that the negative torque generated by the second electric motor MG2 is controlled so as to prevent the change of the operating speed of the engine 12. Accordingly, the positive torque generated by the first electric motor MG1 is controlled so as to generate the reverse vehicle drive force corresponding to the required vehicle drive force, so that the reverse vehicle drive force is generated according to an intention of the operator of the hybrid vehicle. Further, the negative torque generated by the second electric motor MG2 is controlled so as to prevent the change of the operating speed of the engine 12, so that it is possible to prevent deterioration of the fuel economy due to the friction loss of the engine 12 caused by the rise of the engine speed, and deterioration of the fuel economy due to an idling operation of the engine 12 at a predetermined speed which would be performed as a result of a drop of the engine speed, for instance.

The drive control device for the hybrid vehicle according to the present embodiment is further configured such that the first electric motor MG1 is operated in the positive direction so as to generate the positive torque, while the second electric motor MG2 is operated in the positive direction so as to generate the negative torque. Accordingly, the second electric motor MG2 performs a regenerative operation to generate the negative torque, so that an electric energy generated by the regenerative operation can be consumed by the first electric motor MG1 to generate the positive torque.

Other preferred embodiments of the present invention will be described in detail by reference to the drawings. In the following description, the same reference signs will be used to identify the same elements in the different embodiments, which will not be described redundantly.

Second Embodiment

FIGS. 12-17 are the schematic views for explaining arrangements of respective hybrid vehicle drive systems 100, 110, 120, 130, 140 and 150 according to other preferred modes of this invention used instead of the hybrid vehicle drive system 10 of the previous embodiment. The hybrid vehicle drive control device of the present invention is also applicable to drive systems such as the drive system 100 shown in FIG. 12 and the drive system 110 shown in FIG. 13, which have respective different arrangements of the first electric motor MG1, first planetary gear set 14, second electric motor MG2, second planetary gear set 16, clutch CL and brake BK in the direction of the center axis CE. The present hybrid vehicle drive control device is also applicable to drive systems such as the drive system 120 shown in FIG. 14, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction. The present hybrid vehicle drive control device is further applicable to drive systems such as the drive system 130 shown in FIG. 15, the drive system 140 shown in FIG. 16 and the drive system 150 shown in FIG. 17, which is provided with a second differential mechanism in the form of a second planetary gear set 16' of a double-pinion type, in place of the second planetary gear set 16 of a single-pinion type. This second planetary gear set 16' is provided with rotary elements (elements) consisting of a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Each of the hybrid vehicle drive systems 100, 110, 120, 130, 140 and 150 according to the present second embodiment is provided with: a first differential mechanism in the form of the first planetary gear set 14 having a first rotary element in the form of the sun gear S1 connected to the first electric motor MG1, a second rotary element in the form of the carrier C1 connected to the engine 12, and a third rotary element in the form of the ring gear R1 connected to a output rotary member in the form of the output gear 30; a second differential mechanism in the form of the second planetary gear set 16 (16') having a first rotary element in the form of the sun gear S2 (S2') connected to the second electric motor MG2, a second rotary element in the form of the carrier C2 (C2') and a third rotary element in the form of the ring gear R2 (R2'), one of the carrier C2 (C2') and the ring gear R2 (R2') being connected to the ring gear R1 of the first planetary gear set 14; the clutch CL for selectively connecting the carrier C1 of the first planetary gear set 14 and the other of the carrier C2 (C2') and the ring gear R2 (R2') which is not connected to the ring gear R1, to each other; and the brake BK for selectively connecting the other of the carrier C2 (C2') and the ring gear R2 (R2') which is not connected to the ring gear R1, to a stationary member in the form of the housing 26. Accordingly, the electronic control device 40 applied to the present second embodiment permits generation of a sufficient vehicle reverse drive force, without having to operate the engine 12 or to change the operating speed of the engine 12, by operating the first electric motor MG1 in the positive direction so as to generate a positive torque and operating the second electric motor MG2 in the positive direction so as to generate a negative torque, with the clutch CL being placed in the engaged state, in place of the brake BK failing to normally function, to run the hybrid vehicle in the reverse direction, as in the first embodiment described above.

Third Embodiment

Figure 18:
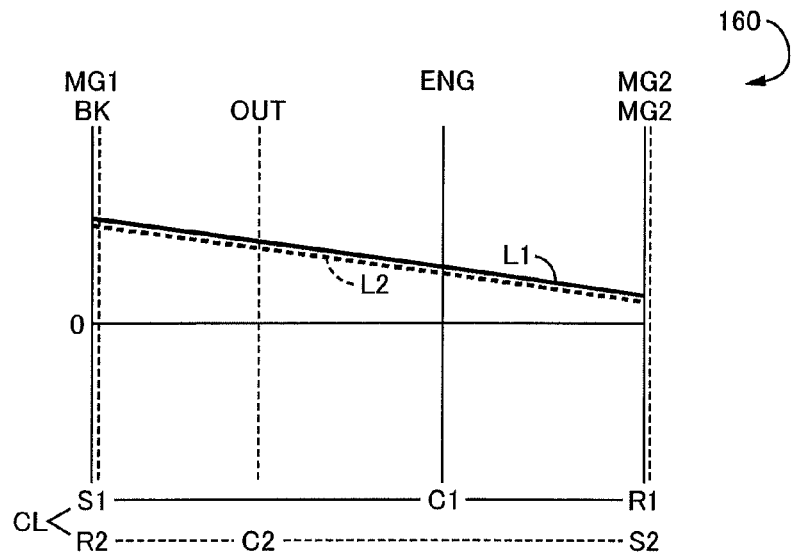
FIG. 18 is a collinear chart for explaining an arrangement of a hybrid vehicle drive system according to another preferred embodiment of this invention.
Figure 19:
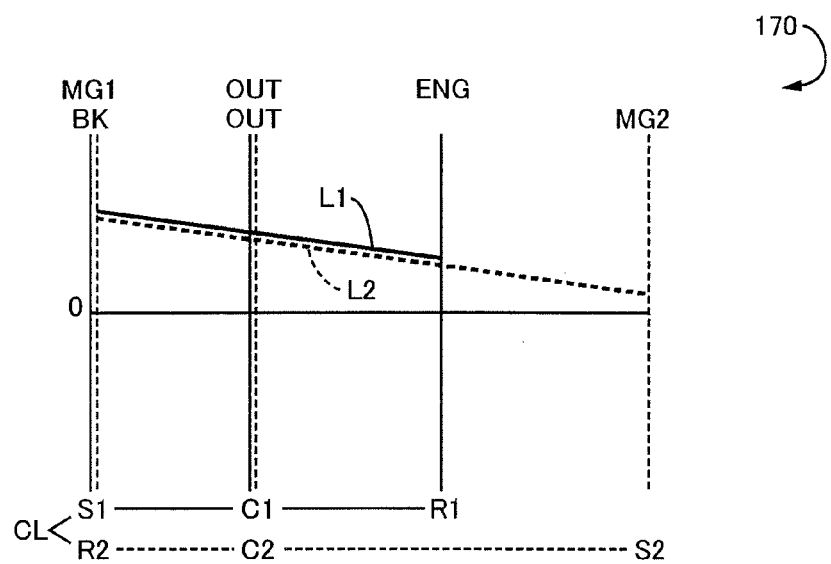
FIG. 19 is a collinear chart for explaining an arrangement of a hybrid vehicle drive system according to a further preferred embodiment of this invention.
Figure 20:
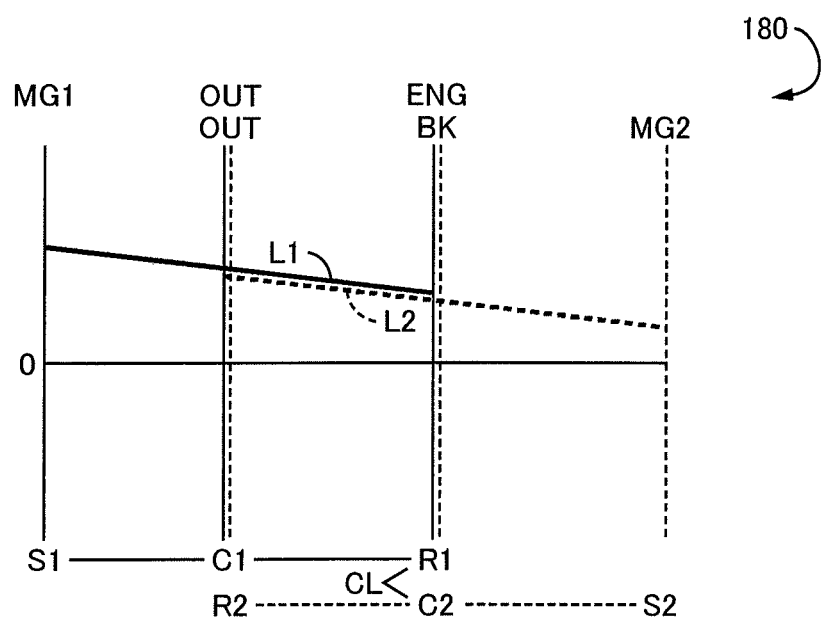
FIG. 20 is a collinear chart for explaining an arrangement of a hybrid vehicle drive system according to a still further preferred embodiment of this invention.

FIGS. 18-20 are the collinear charts for explaining arrangements and operations of respective hybrid vehicle drive systems 160, 170 and 180 according to other preferred modes of this invention in place of the drive system 10 of the first embodiment described above. As described above, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2.

In the drive system 160 for the hybrid vehicle, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. In the drive system 170 for the hybrid vehicle, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. In the drive system 180 for the hybrid vehicle, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL.

The electronic control device 40 applied to the present third embodiment of FIGS. 18-20 permits generation of a sufficient reverse vehicle drive force, without having to operate the engine 12 or to change the operating speed of the engine 12, by operating the first electric motor MG1 in the positive direction so as to generate a positive torque and operating the second electric motor MG2 in the positive direction so as to generate a negative torque, with the clutch CL being placed in the engaged state, in place of the brake BK failing to normally function, to run the hybrid vehicle in the reverse direction, as in the first embodiment of FIG. 9.

The drive systems for the hybrid vehicle according to the embodiments of FIG. 9, FIGS. 13-16 and FIG. 17-19 are identical with each other in that each of these drive systems for the hybrid vehicle is provided with the first differential mechanism (first planetary gear set 14) and the second differential mechanism (second planetary gear set 16, 16'), which as a whole have four rotary elements indicated in the collinear chart, and is further provided with the first electric motor MG1, second electric motor MG2, engine 12 and output rotary member (output gear 30) which are connected to the respective four rotary elements. In these drive systems for the hybrid vehicle, one of the four rotary elements is constituted by the rotary element (S1, C1, R1) of the first differential mechanism (first planetary gear set 14) and the rotary element (S2, R2, C2; S2', R2', C2') of the second differential mechanism (second planetary gear set 16, 16') which are selectively connected to each other through the clutch CL, and the rotary element (R2, R2', C2) of the first differential mechanism selectively connected to the rotary element of the first planetary gear set 14 through the clutch CL is selectively fixed to the housing (stationary member) 26 through the brake BK.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 100, 110, 120, 130, 140, 150, 160, 170, 180: Hybrid vehicle drive system
12: Engine 14: First planetary gear set (First differential mechanism)
16, 16': Second planetary gear set (Second differential mechanism)
18, 22: Stator 20, 24: Rotor 26: Housing (Stationary member)
28: Input shaft 30: Output gear (Output rotary member)
40: Electronic control device (Drive control device)
72: Engine starting requirement determining portion
74: Mode determining portion
78: Reverse drive determining portion
80: Brake failure determining portion
82: Reverse drive control portion BK: Brake CL: Clutch C1, C2, C2': Carrier (Second rotary element)
MG1: First electric motor MG2: Second electric motor
R1, R2, R2': Ring gear (Third rotary element)
S1, S2, S2': Sun gear (First rotary element)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake wherein the rotary components of said first and second differential mechanisms are a carrier of each of said first and second differential mechanism, said drive control device comprising:
a reverse drive control portion configured to operate said first electric motor so as to generate a positive torque and operate said second electric motor so as to generate a negative torque, with said clutch being placed in an engaged state and said brake being placed in a released state, to run the hybrid vehicle in a reverse direction.

2. The drive control device according to claim 1, wherein said reverse drive control portion controls the positive torque and the negative torque generated by said first electric motor and said second electric motor in a non-operated state of said engine, so as to prevent a rotary motion of said engine.

3. The drive control device according to claim 2, wherein said reverse drive control portion controls the positive torque generated by said first electric motor so as to generate a reverse vehicle drive force corresponding to a vehicle drive force required by an operator of the hybrid vehicle, and controls the negative torque generated by said second electric motor so as to prevent a rotary motion of said engine in a positive or negative direction.

4. The drive control device according to claim 1, wherein said reverse drive control portion controls the positive torque and the negative torque generated by said first electric motor and said second electric motor in an operated state of said engine so as to prevent a change of an operating speed of said engine.

5. The drive control device according to claim 4, wherein said reverse drive control portion controls the positive torque generated by said first electric motor so as to generate a reverse vehicle drive force corresponding to a vehicle drive force required by an operator of the hybrid vehicle, and controls the negative torque generated by said second electric motor so as to prevent the change of the operating speed of said engine.

6. The drive control device according to claim 1, wherein said reverse drive control portion operates said first electric motor in a positive direction so as to generate the positive torque, and operates said second electric motor in a positive direction so as to generate the negative torque.

* * * * *